(12) United States Patent
Wong et al.

(10) Patent No.: US 8,576,723 B2
(45) Date of Patent: Nov. 5, 2013

(54) HIGH SPEED COUNTER DESIGN

(75) Inventors: Yuen Fai Wong, San Jose, CA (US); Hui Zhang, Cupertino, CA (US)

(73) Assignee: Foundry Networks, LLC, San Jose, CA (US)

( * ) Notice: Subject to any disclaimer, the term of this patent is extended or adjusted under 35 U.S.C. 154(b) by 1330 days.

(21) Appl. No.: 12/271,394

(22) Filed: Nov. 14, 2008

(65) Prior Publication Data

US 2012/0166760 A1    Jun. 28, 2012

(51) Int. Cl.
*H04L 1/00*    (2006.01)

(52) U.S. Cl.
USPC .......................................... 370/241; 370/252

(58) Field of Classification Search
USPC .................... 370/203, 229, 241, 252, 465
See application file for complete search history.

(56) References Cited

U.S. PATENT DOCUMENTS

| | | | |
|---|---|---|---|
| 6,944,256 B2 | 9/2005 | Smallwood et al. | |
| 7,031,302 B1 | 4/2006 | Malalur | |
| 7,769,744 B2 * | 8/2010 | Waas et al. | 707/711 |
| 2004/0054876 A1 * | 3/2004 | Grisenthwaite et al. | 712/218 |

OTHER PUBLICATIONS

Ramabhadran et al., "Efficient Implementation of a Statistics Counter Architecture," 11 pages from SIGMETRICS '03, held Jun. 10-14, 2003 in San Diego, CA.
Shah et al., "Analysis of a Statistics Counter Architecture," 5 pages, Computer Systems Laboratory, Stanford University, Stanford, CA, supported by NSF under NGI contract ANI-9872761.
Shah et al., "Maintaining Statistics Counters in Router Line Cards," *IEEE Micro*, Jan.-Feb. 2002, pp. 76-81.
Yang et al., "High Speed Architecture for Galois/Counter Mode of Operation (GCM)," pp. 1-15, ECE Department, Polytechnic University, Brooklyn, NY.
Zhao et al., "Design of a Novel Statistics Counter Architecture with Optimal Space and Time Efficiency," 12 pages from SIG Metrics/Performance '06, held Jun. 26-30, 2006 in Saint Malo France.

* cited by examiner

*Primary Examiner* — Ian N Moore
*Assistant Examiner* — Mon Cheri Davenport
(74) *Attorney, Agent, or Firm* — Fountainhead Law Group P.C.

(57) ABSTRACT

Techniques for incrementing counters in an efficient manner. In one set of embodiments, counter logic circuits are provided that can operate at higher frequencies than existing counter logic circuits, while being capable of being implemented in currently available field programmable gate arrays (FPGAs) or fabricated using currently available process technologies. The counter logic circuits of the present invention may be used to increment statistics counters in network devices that support line speeds of 40 Gbps, 100 Gbps, and greater.

27 Claims, 5 Drawing Sheets

HIGH SPEED COUNTER DESIGN

BACKGROUND OF THE INVENTION

Embodiments of the present invention relate to data processing, and more particularly relate to techniques for incrementing counters in an efficient manner.

Many network devices (e.g., routers, switches, etc.) maintain counters to perform various operations such as tracking network statistics. Merely by way of example, an Ethernet switch may maintain counters to track the total number of data packets received, the total number of data packets dropped, the total number of bytes forwarded, and the like. These statistics are useful for carrying out performance monitoring, traffic engineering, intrusion detection, and other network management functions.

Since the counters in network devices typically track statistics related to incoming data packets, these counters must generally be incremented at a rate proportional to line speed. For example, if data packets arrive at a rate of R Gigabits per second (Gbps), if the minimum size of a data packet is P bits, and if C counters are incremented per data packet, at most RC/P billion counters must be incremented per second. To support this type of speed, many network devices include logic circuits (hereinafter referred to as counter logic circuits) dedicated to incrementing counters in hardware.

While existing counter logic circuits have provided adequate performance for incrementing statistics counters in low bandwidth network devices, the speeds of these existing circuits have become a bottleneck in high bandwidth devices that support emerging data transmissions standards such as OC786, 40 G (i.e., 40 Gbps) Ethernet, and 100 G (i.e., 100 Gbps) Ethernet. In particular, the design of these existing circuits generally requires certain operations to be performed in a single clock cycle, thereby limiting their maximum operating frequency. This, in turn, makes it very difficult (or impossible) to achieve the counter update performance necessary to support line speeds of 40 Gbps, 100 Gbps, and beyond.

Accordingly, it would be desirable to have improved counter logic circuits that can operate at higher frequencies than existing designs.

BRIEF SUMMARY OF THE INVENTION

Embodiments of the present invention provide techniques for incrementing counters in an efficient manner. In one set of embodiments, counter logic circuits are provided that can operate at higher frequencies than existing counter logic circuits, while being capable of being implemented in currently available field programmable gate arrays (FPGAs) or fabricated using currently available process technologies. The counter logic circuits of the present invention may be used to increment statistics counters in network devices that support line speeds of 40 Gbps, 100 Gbps, and greater.

According to one embodiment of the present invention, a method for incrementing a counter in a logic circuit comprises receiving a stream comprising a plurality of index/value pairs, each index/value pair including a counter index referencing a counter value to be incremented and an increment value. The method further comprises determining two or more index/value pairs in the stream that include a common counter index. The stream is then caused to include an index/value pair including the common counter index and an increment value corresponding to a sum of the increment values included in the two or more index/value pairs.

In an embodiment, the step of determining two or more index/values pairs in the stream that include a common counter index comprises determining exactly two index/value pairs.

In an embodiment, the two or more index/value pairs are temporally adjacent in the stream.

In an embodiment, causing the stream to include the index/value pair including the common counter index and the increment value corresponding to a sum of the increment values included in the two or more index/value pairs comprises modifying a first index/value pair in the two or more index/value pairs such that the increment value included in the first index/value pair corresponds to the sum of the increment values included in the two or more index/value pairs. In a further embodiment, a second index/value pair in the two or more index/value pairs is modified such that the counter index included in the second index/value pair no longer corresponds to the common counter index.

In an embodiment, causing the stream to include the index/value pair including the common counter index and the increment value corresponding to a sum of the increment values included in the two or more index/value pairs comprises creating a new index/value pair based on the two or more index/value pairs, removing the two or more index/value pairs from the stream, and inserting the fused index/value pair into the stream. In a further embodiment, a dummy index/value pair is created that includes an a dummy counter index, and the dummy index/value pair is inserted into the stream such that the dummy index/value pair is temporally adjacent to the index/value pair including the common counter index and the increment value corresponding to a sum of the increment values included in the two or more index/value pairs.

In an embodiment, a sliding window is used to determine a set of index/value pairs in the stream from which the two or more index/value pairs are determined. In a further embodiment, the size of the sliding window is predetermined based on a maximum acceptable latency for the logic circuit.

In an embodiment, subsequent to causing the stream to include the index/value pair including the common counter index and the increment value corresponding to a sum of the increment values included in the two or more index/value pairs, the stream is passed to a pipelined processing component of the logic circuit, the pipelined processing component being configured to increment one or more counter values based on the stream.

In an embodiment, the logic circuit is implemented in a packet processor of a network device, and the stream is generated based on one or more data packets received at the packet processor. In an embodiment, the counter is a statistics counter and the network device is an Ethernet switch. In another embodiment, the packet processor is configured to support a data throughput rate of at least 40 Gbps or at least 100 Gbps.

According to another embodiment of the present invention, a logic circuit for incrementing a counter is provided. The logic circuit comprises a fusion component configured to receive a stream comprising a plurality of index/value pairs, each index/value pair including a counter index referencing a counter value to be incremented and an increment value. The fusion component is further configured to determine two or more index/value pairs in the stream that include a common counter index. The stream is then caused to include an index/value pair including the common counter index and an increment value corresponding to a sum of the increment values included in the two or more index/value pairs.

In an embodiment, the logic circuit further comprises a pipelined processing component configured to receive the stream from the fusion component and increment one or more counter values based on the stream. In a further embodiment, the pipelined processing component comprises a plurality of successive pipeline stages including an adder pipeline stage configured to add an increment value to a counter value, and the pipelined processing component is configured to feed back an output of the pipelined processing component to each pipeline stage in the plurality of successive pipeline stages except the adder pipeline stage. In yet a further embodiment, the pipelined processing unit does not require a multiplexing operation to be performed in the adder pipeline stage. In various embodiments, the adder pipeline stage is the final pipeline stage in the plurality of successive pipeline stages.

In an embodiment, the logic circuit is implemented in a packet processor of a network device, and the stream is generated based on one or more data packets received at the packet processor. In an embodiment, the counter is a statistics counter and the network device is an Ethernet switch. In another embodiment, the packet processor is configured to support a data throughput rate of at least 40 Gbps or at least 100 Gbps.

According to another embodiment of the present invention, a network device is provided. The network device comprises a logic circuit including a fusion component configured to receive a stream comprising a plurality of index/value pairs, each index/value pair including a counter index referencing a counter value to be incremented and an increment value. The fusion component is further configured to determine two or more index/value pairs in the stream that include a common counter index. The stream is then caused to include an index/value pair including the common counter index and an increment value corresponding to a sum of the increment values included in the two or more index/value pairs.

In an embodiment, the logic circuit in the network device further comprises a pipelined processing component configured to receive the stream from the fusion component and increment one or more counters based on the stream. In a further embodiment, the pipelined processing component comprises a plurality of successive pipeline stages including an adder pipeline stage configured to add an increment value to a counter value, and the pipelined processing component is configured to feed back an output of the pipelined processing component to each pipeline stage in the plurality of successive pipeline stages except the adder pipeline stage. In yet a further embodiment, the pipelined processing unit does not require a multiplexing operation to be performed in the adder pipeline stage.

In an embodiment, the counter is a statistics counter and the network device is an Ethernet switch.

In an embodiment, the stream is generated based on one or more data packets received at a packet processor of the network device. In an embodiment, the packet processor is configured to support a data throughput rate of at least 40 Gbps or at least 100 Gbps.

According to another embodiment of the present invention, a network device is provided. The network device comprises a memory component configured to store a counter value for a counter and a logic circuit comprising a plurality of successive pipeline stages, the plurality of successive pipeline stages including an adder pipeline stage configured to add an increment value to the counter value. In various embodiments, the logic circuit is configured to feed back an output of the logic circuit to one or more pipeline stages in the plurality of successive pipeline stages except the adder pipeline stage. In a particular embodiment, the adder pipeline stage is the final pipeline stage in the plurality of successive pipeline stages.

According to another embodiment of the present invention, a network device is provided. The network device comprises a memory component configured to store a counter value for a counter and a logic circuit comprising a plurality of pipeline stages, the plurality of pipeline stages including an adder pipeline stage configured to add an increment value to the counter value. In various embodiments, the logic circuit does not require a multiplexing operation to be performed in the adder pipeline stage.

According to another embodiment of the present invention, a network device is provided. The network device comprises a memory component configured to store a counter value for a counter and a logic circuit configured to increment the counter value. In various embodiments, the logic circuit includes a plurality of successive pipeline stages, and the logic circuit only performs a single operation in the final pipeline stage. In a particular embodiment, the single operation is an addition operation.

The foregoing, together with other features, embodiments, and advantages of the present invention, will become more apparent when referring to the following specification, claims, and accompanying drawings.

BRIEF DESCRIPTION OF THE DRAWINGS

In the drawings, the use of like reference numbers in different drawings indicates similar components.

DETAILED DESCRIPTION OF THE INVENTION

In the following description, for the purposes of explanation, numerous specific details are set forth in order to provide an understanding of the present invention. It will be apparent, however, to one skilled in the art that the present invention may be practiced without some of these specific details.

Embodiments of the present invention provide techniques for incrementing counters in an efficient and performance-oriented manner. According to one set of embodiments, a counter logic circuit (or a component thereof) is configured to receive an input stream of counter index/increment value pairs (hereinafter referred to as index/value pairs). Each index/value pair in the stream includes a counter index referencing a counter value to be incremented and a corresponding increment value (i.e., a value to be added to the counter value). For example, an index/value pair of (A, 5) indicates that the counter value referenced by index A is to be incremented by 5. In one set of embodiments, the counter index points to a location in memory (e.g., main memory, cache memory, etc.) storing the counter value.

As the stream of index/value pairs is received, the counter logic circuit is configured to determine two or more index/value pairs in the stream that include a common counter index. The counter logic circuit is further configured to modify the stream to include a fused index/value pair based on the two or more index/value pairs, the fused index/value pair including the common counter index and an increment value corresponding to a sum of the increment values included in the two or more index/value pairs. The modified stream (including the fused index/value pair) is then processed by the counter logic circuit to increment the appropriate counter values.

Creating a single, fused index/value pair from two or more index/value pairs that share a common counter index as described above eliminates situations where the counter logic circuit must process back-to-back updates to the same counter value. In a conventional counter logic circuit, the signal path that is used to process such back-to-back updates is typically the longest signal path in the circuit (hereinafter referred to as the critical path of the circuit). The length of this critical path limits the maximum operating frequency of the circuit. By eliminating back-to-back updates to the same counter value, embodiments of the present invention advantageously allow the critical path of a counter logic circuit to be shortened and, accordingly, the maximum operating frequency of the circuit to be increased.

For example, in a scenario where back-to-back updates to a single counter can occur, a pipelined processing component of a conventional counter logic circuit must be able to perform a multiplexer operation (to select the updated counter value from the previous clock cycle) and an addition operation (to increment the counter value) in a single pipeline stage. This critical path places an upper limit on the maximum operating frequency of the counter logic circuit. In embodiments of the present invention where no back-to-back updates occur, the multiplexer operation and the addition operation can be split across two pipeline stages. This reduces the critical path and allows for higher frequency operation of the counter logic circuit, thereby improving overall counter update speed.

The techniques of the present invention may be applied to a variety of different domains and contexts. In one embodiment, the techniques may be used in the networking and data communication domain. In a networking environment, the techniques may be employed by network devices such as Ethernet-based routers, switches, and the like to facilitate high speed incrementing of statistics counters. Due to this enhanced performance, embodiments of the present invention enable such network devices to support the high-speed packet processing required for data transmission standards such as OC768, 40 G Ethernet, and 100 G Ethernet.

Figure 1:
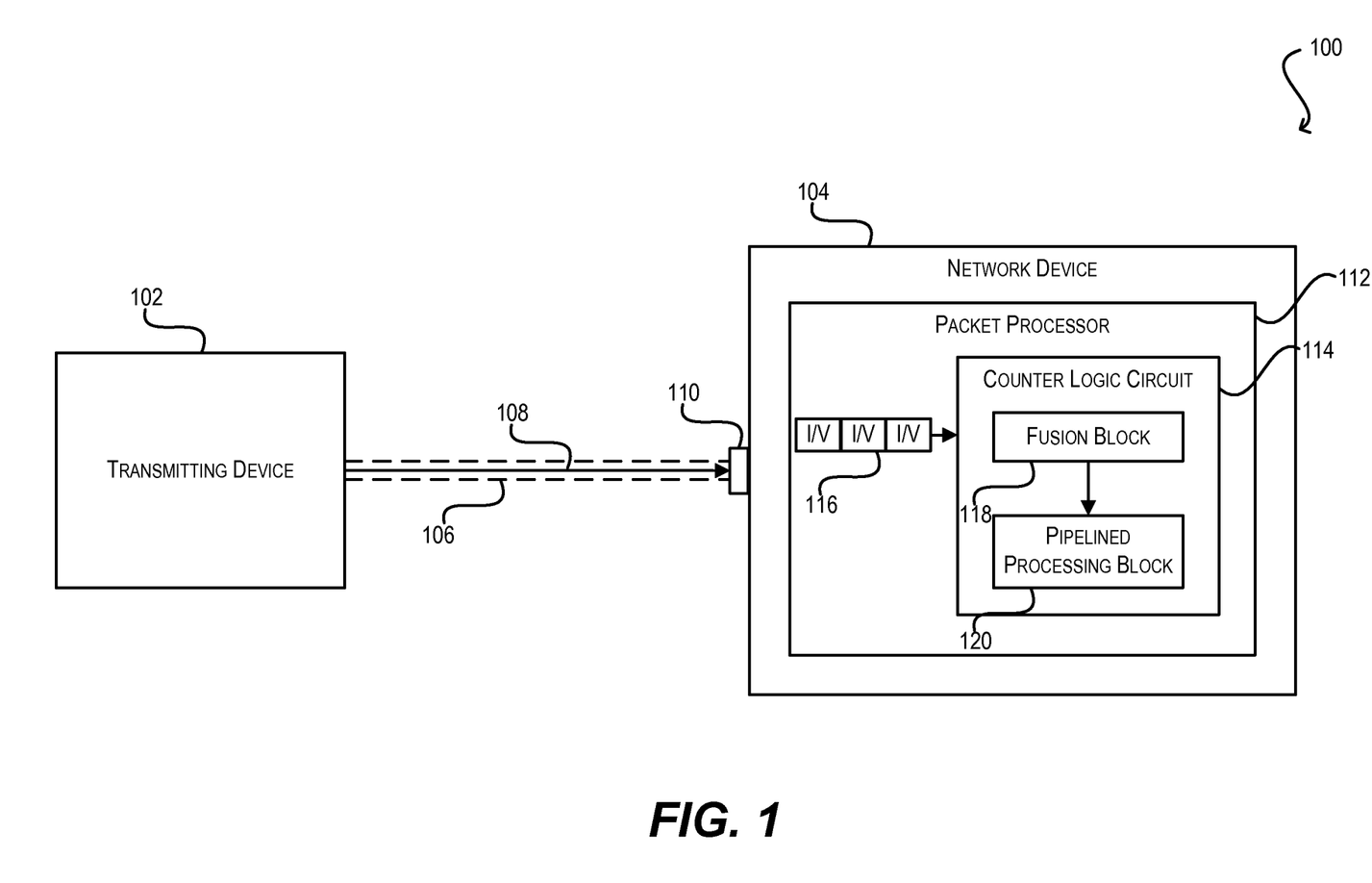
FIG. 1 is a simplified block diagram of a system that may incorporate an embodiment of the present invention.

FIG. 1 is a simplified block diagram of a system 100 that may incorporate an embodiment of the present invention. As shown, system 100 comprises a transmitting device 102 coupled to a receiving network device 104 via a data link 106. Receiving network device 104 may be a router, switch, hub, host network interface, or the like. In one embodiment, network device 104 is an Ethernet-based network switch, such as network switches provided by Foundry Networks, Inc. of Santa Clara, Calif. or switches described in U.S. Pat. Nos. 7,187,687, 7,206,283, 7,266,117, and 6,901,072. Network device 104 may be configured to support data transmission speeds of at least 40 Gbps, at least 100 Gbps, or greater.

Figure 2:
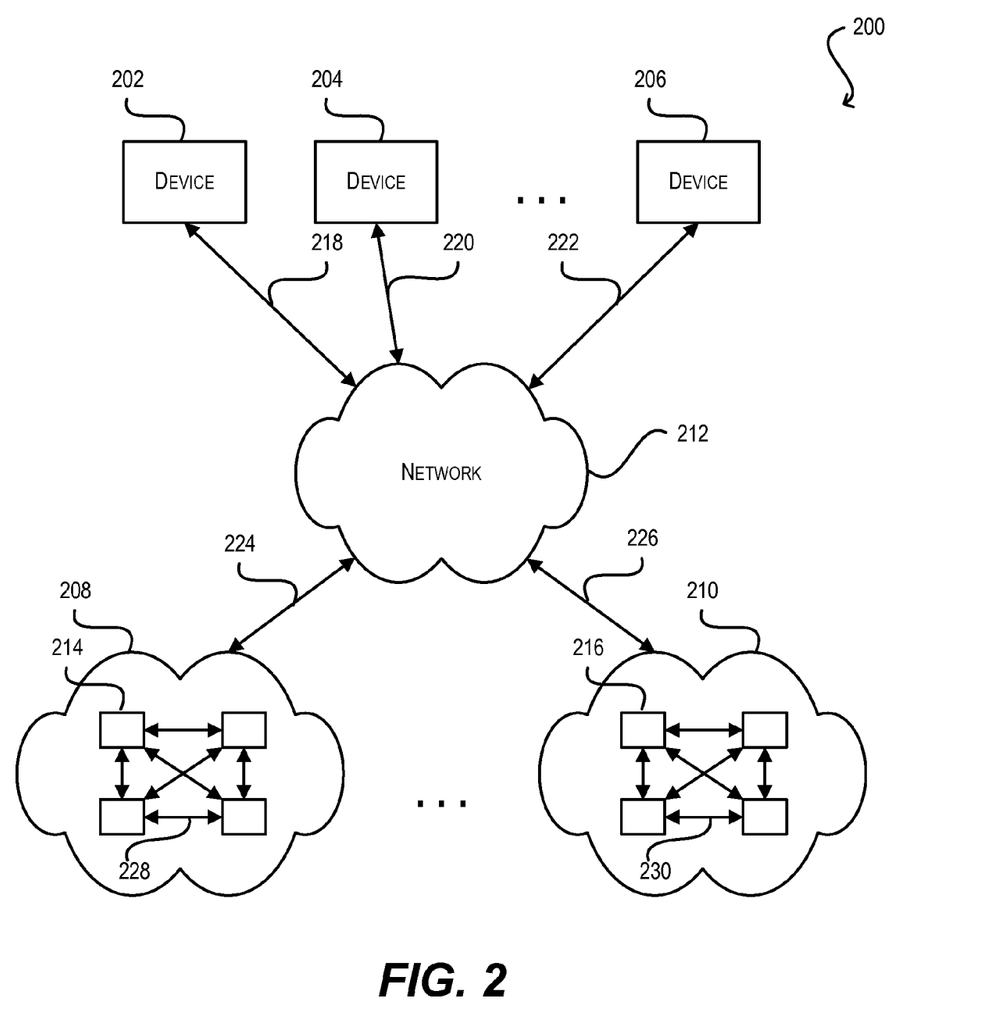
FIG. 2 is a simplified block diagram of a network environment that may incorporate an embodiment of the present invention.

Transmitting device 102 may also be a network device, or may be some other hardware and/or software-based component capable of transmitting data. Although only a single transmitting device and receiving network device are shown in FIG. 1, it should be appreciated that system 100 may incorporate any number of these devices. Additionally, system 100 may be part of a larger system environment or network, such as a computer network (e.g., a local area network (LAN), wide area network (WAN), the Internet, etc.) as shown in FIG. 2.

Transmitting device 102 may transmit a plurality of data packets 108 to network device 104 using data link 106. Data link 106 may be any transmission medium, such as a wired (e.g., optical, twisted-pair copper, etc.) or wireless (e.g., 802.11, Bluetooth, etc.) link. Various different protocols may be used to communicate data packets 108 from transmitting device 102 to receiving network device 104. In an embodiment, data packets 108 are transmitted via data link 106 using a network protocol (e.g., Ethernet, TCP/IP, etc.).

Network device 104 may receive data packets 108 at one or more ports 110. The data packets received over a port 110 may then be routed to a packet processor 112. Although not shown, packet processor 112 may be coupled to various memories, such as an external Content Addressable Memory (CAM) or external Random Access Memory (RAM).

Packet processor 112 may be configured to perform a variety of processing operations on data packets 108. These operations may include forwarding the data packets to other components in network device 104, updating header information in the data packets, and the like. In one set of embodiments, packet processor 112 is a dedicated processor (rather than a general-purpose processor) and is implemented in an FPGA or an application-specific integrated circuit (ASIC).

In a specific set of embodiments, packet processor 112 is configured to maintain one or more counters for performing operations such as tracking statistics related to incoming data packets 108. To facilitate this, packet processor 112 may include one or more counter logic circuits 114. As shown, counter logic circuit 114 is configured to receive an input stream of index/value pairs 116, each index/value pair including a counter index referencing a counter value to be incremented and a corresponding increment value. Although stream 116 is shown as comprising three index/value pairs, it should be appreciated that stream 116 may include any number of index/value pairs. Stream 116 may be received from packet processor 112, or from another component of network device 104.

Counter logic circuit 114 is further configured to modify (e.g., at fusion block 118) stream 116 in a manner that eliminates back-to-back updates to the same counter value. Finally, counter logic circuit is configured to process (e.g., at pipelined processing block 120) the modified version of stream 116 to carry out an increment operation for each index/value pair in the modified stream. By employing this type of design, counter logic circuit 114 can operate at a higher frequency than prior art counter circuits. This, in turn, enables packet processor 112 to process data packets 108 at a data throughput rate of 40 Gbps, 100 Gbps, or more. The operation of counter logic circuit 114, including fusion block 118 and pipelined processing block 120, is discussed in greater detail below.

In the example of FIG. 1, counter logic circuit 114 is shown as a subcomponent of packet processor 112. However, in alternative embodiments counter logic circuit 114 may be implemented as a standalone component that is structurally separate from packet processor 112, or as a subcomponent of a different component in network device 104. One of ordinary skill in the art would recognize may variations, modifications, and alternatives.

FIG. 2 is a simplified block diagram of a network environment that may incorporate an embodiment of the present invention. Network environment 200 may comprise any number of transmitting devices, data links, and receiving devices as described above with respect to FIG. 1. As shown, network environment 200 includes a plurality of network devices 202, 204, 206 and a plurality of sub-networks 208, 210 coupled to a network 212. Additionally, sub-networks 208, 210 include one or more nodes 214, 216.

Network devices 202, 204, 206 and nodes 214, 216 may be any type of device capable of transmitting or receiving data via a communication channel. Examples of network devices include a router, switch, hub, host network interface, and the like. Sub-networks 208, 210 and network 212 may be any type of network that can support data communications using any of a variety of protocols, including without limitation Ethernet, ATM, token ring, FDDI, 802.11, TCP/IP, IPX, and the like. Merely by way of example, sub-networks 208, 210 and network 212 may be a LAN, a WAN, a virtual network (such as a virtual private network (VPN)), the Internet, an intranet, an extranet, a public switched telephone network (PSTN), an infra-red network, a wireless network, and/or any combination of these and/or other networks.

Data may be transmitted between any of network devices 202, 204, 206, sub-networks 208, 210, and nodes 214, 216 via one or more data links 218, 220, 222, 224, 226, 228, 230. Data links 218, 220, 222, 224, 226, 228, 230 may be configured to support the same or different communication protocols. Further, data links 218, 220, 222, 224, 226, 228, 230 may support the same or different transmission standards (e.g., 40G Ethernet for links 218, 229, 222 between network devices 202, 204, 206 and network 212, 100 G Ethernet for links 226 between nodes 214 of sub-network 208).

In one embodiment, at least one data link 218, 220, 222, 224, 226, 228, 230 is configured to support 40G or 100 G Ethernet. Additionally, at least one device connected to that link (e.g., a receiving device) is configured to support a data throughput of at least 40 Gbps or 100 Gbps. In this embodiment, the receiving device may correspond to receiving network device 104 of FIG. 1, and may incorporate a counter logic circuit 114 as described herein.

Figure 3:
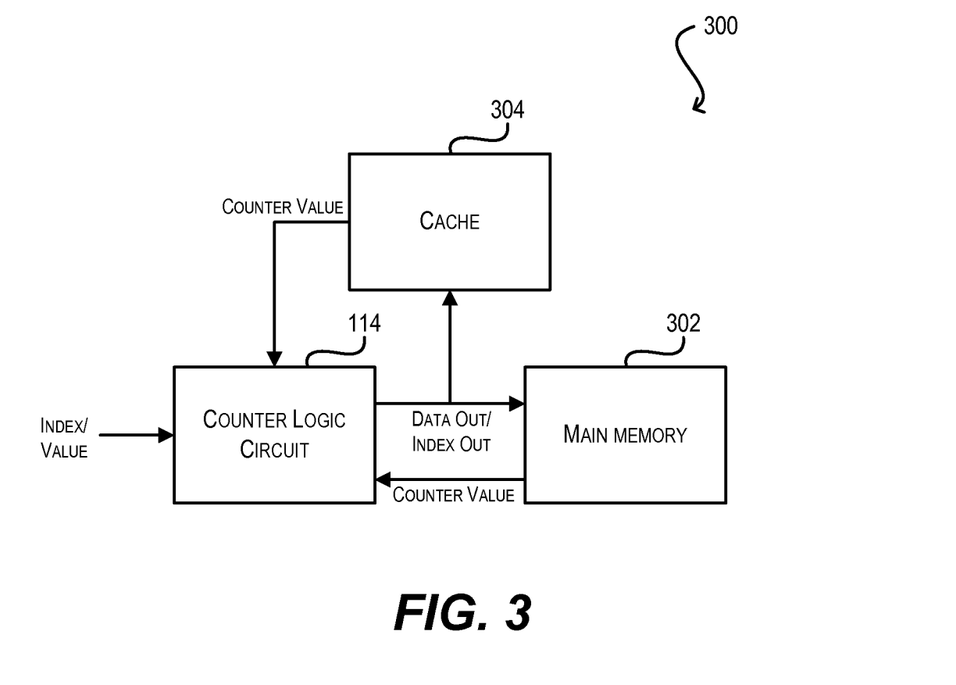
FIG. 3 is a simplified block diagram of a memory configuration for a counter logic circuit in accordance with an embodiment of the present invention.

FIG. 3 is a simplified block diagram of a memory configuration 300 for a counter logic circuit in accordance with an embodiment of the present invention. Specifically, memory configuration 300 may be used in conjunction with counter logic circuit 114 of FIG. 1. As shown, memory configuration 300 includes a main memory 302 and a cache memory 304. In various embodiments, main memory 302 and cache memory 304 are configured to store counter values for the counters updated by counter logic circuit 114.

In one set of embodiments, when an index/value pair is received at counter logic circuit 114, the circuit will read, or fetch, the current counter value for the index from main memory 302 and/or cache memory 304. The circuit will then increment the fetched counter value with the increment value included in the index/value pair, and write the updated counter value back to main memory 302 and/or cache memory 304. Each read and write operation may consume a number of clock cycles. Typically, read/write operations to cache memory 304 consume a smaller number of cycles than read/write operations to main memory 302. Accordingly, in situations where counter logic circuit 114 needs to read a counter value before its current, updated value is written to main memory 302, the updated counter value can generally be retrieved from cache memory 304.

In some cases, however, counter logic circuit 114 may need to retrieve an updated counter value before the updated value can be read from cache memory 304. For example, assume a cache read consumes five clock cycles and a cache write consumes one clock cycle. Further, assume that counter logic circuit 114 receives a stream of index/value pairs (one per clock cycle) as shown below:

TABLE 1

| | Clock Cycle C5 | Clock Cycle C4 | Clock Cycle C3 | Clock Cycle C2 | Clock Cycle C1 |
|---|---|---|---|---|---|
| Counter Index | I4 | I4 | I3 | I2 | I1 |
| Increment Value | V5 | V4 | V3 | V2 | V1 |

The stream above includes two temporally adjacent index/value pairs (i.e., the pairs received at clock cycles C4 and C5) that reference a common counter index I4. Assuming that the counter logic circuit is pipelined and configured to increment a counter every clock cycle, the value of counter I4 should be incremented in back-to-back clock cycles. However, since it takes five clock cycles to perform a cache read and one clock cycle to perform a cache write, the value of I4 cannot be incremented in back-to-back clock cycles because the value of I4 cannot be incremented by V4, written to cache, read from cache, and then incremented again by V5 within a single clock cycle.

To overcome this issue, conventional counter logic circuits incorporate a feedback mechanism that loops the output of the circuit to every pipeline stage (including the final pipeline stage) within the circuit. Thus, when the value of I4 has been incremented by V4 and outputted, the updated value of I4 can be fed back into the immediately preceding pipeline stage, where it can be selected and incremented by V5 in the next clock cycle.

However, a problem with the above approach is that it requires the counter logic circuit to perform a multiplexer operation and an addition operation in a single clock cycle. For example, when the updated value of I4 is fed back to the circuit, that value must be selected using a multiplexer and then incremented using an adder in the final pipeline stage. This creates a critical path in the circuit that limits its maximum operating frequency.

Figure 4:
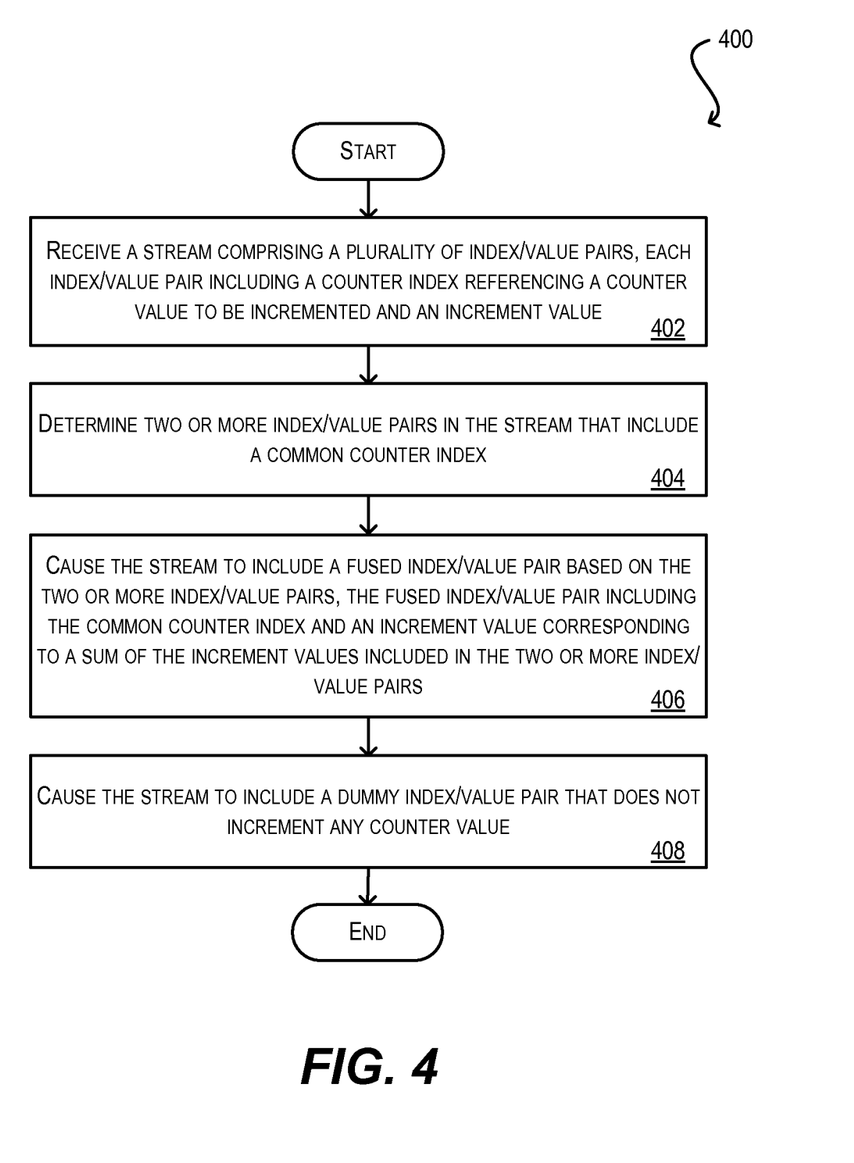
FIG. 4 is a flowchart illustrating steps performed in incrementing a counter in a counter logic circuit in accordance with an embodiment of the present invention.

To shorten this critical path, embodiments of the present invention provide techniques for modifying the stream received at a counter logic circuit such that back-to-back updates to a single counter no longer occur. FIG. 4 is a flowchart 400 illustrating one such technique. It should be appreciated that the processing of flowchart 400 is merely illustrative of an embodiment of the present invention and is not intended to limit the scope of the invention or any equivalents thereof. In one set of embodiments, the processing of flowchart 400 is carried out by counter logic circuit 114 of FIG. 1 or a component thereof (such as fusion block 118).

At step 402, a stream comprising a plurality of index/value pairs is received, where each index/value pair includes a counter index referencing a counter value to be incremented and a corresponding increment value. In one set of embodiments, the increment value is a positive value. In alternative embodiments, the increment value may be a positive or a negative value, thereby allowing the counter value to be decremented (rather than incremented).

Generally speaking, one index/value pair will be received per clock cycle of the counter logic circuit. In embodiments where the counter logic circuit is implemented in a network device, the stream may be received from a packet processor (such as packet processor 112 of FIG. 1) based on one or more data packets received at the packet processor.

At step 404, two or more index/value pairs in the stream that include a common counter index are determined. For example, in the stream of Table 1, the index/value pairs received at clock cycles C4 and C5 (i.e., (I4, V4) and (I4, V5))

would be determined because they share common counter index I4. In one set of embodiments, exactly two index/value pairs that share a common counter index are determined at step 404. In alternative embodiments, three, four, or more index/value pairs may be determined.

In one set of embodiments, the two or more index/value pairs determined at step 404 are temporally adjacent in the stream. For example, index/value pairs (I4, V4) and (I4, V5) are temporally adjacent in the stream of Table 1. In other embodiments, one or more subsets of the two or more index/value pairs may be temporally adjacent in the stream. In yet other embodiments, none of the index/value pairs in the two or more index/value pairs may be temporally adjacent.

In one set of embodiments, a sliding window is used to determine a set of index/value pairs in the stream from which the two or more index/value pairs are determined. Since the set of index/value pairs in the sliding window will typically be buffered by the counter logic circuit, the size of the sliding window may be predetermined based on a maximum acceptable latency for the circuit. For example, if the maximum acceptable latency for the counter logic circuit is five clock cycles, the size of the sliding window may be set to five index/value pairs or less (assuming one pair is received per clock cycle).

Once the two or more index/value pairs sharing a common counter index are determined, the stream is modified to include a fused index/value pair determined based on the two or more index/value pairs (step 406). In various embodiments, the fused index/value pair includes the common counter index and an increment value corresponding to the sum of the incremented values included in the two or more index/value pairs. For example, returning to the stream of Table 1, the stream would be modified to include a fused index/value pair based on the index/value pairs at clock cycles C4 and C5. In this example, the fused index/value pair would include the common counter index I4 and an increment value corresponding to the sum of V4 and V5.

Further, the stream is modified to include a dummy index/value pair that, when processed by the counter logic circuit, does not increment any counter value (step 408). Such a dummy index/value pair may include an increment value of zero, an invalid counter index, and/or the like. Generally speaking, this dummy index/value pair is used to maintain the sequencing of index/value pairs in the stream when the two or more index/value pairs determined at step 404 are fused.

In one set of embodiments, the stream may be modified as per steps 406 and 408 by modifying a first index/value pair in the two or more index/value pairs to correspond to the fused index/value pair, and modifying a second index/value pair in the two or more index/value pairs to correspond to the dummy index/value pair. For example, in the stream of Table 1, the index/value pair at clock cycle C4 may be modified to include an increment value of V4 +V5, and the index/value pair at clock cycle C5 may be modified to include an increment value of zero (or an invalid counter index). Thus, the index/value pair at clock cycle C4 is transformed into the fused index/value pair of step 406, and the index/value pair at clock cycle C5 is transformed into the dummy index/value pair of step 408. In this example, the modified stream would comprise the following:

TABLE 2

|  | Clock Cycle C5 | Clock Cycle C4 | Clock Cycle C3 | Clock Cycle C2 | Clock Cycle C1 |
| --- | --- | --- | --- | --- | --- |
| Counter Index | Invalid | I4 | I3 | I2 | I1 |
| Increment Value | 0 | V4 + V5 | V3 | V2 | V1 |

In alternative embodiments, the stream may be modified as per steps 406 and 408 by deleting the two or more index/value pairs determined at step 404 from the stream, creating the fused index/value pair and dummy index/value pair as new index/value pairs, and inserting the new index/value pairs into the stream at the location of the deleted index/value pairs.

In one set of embodiments, the fused and dummy index/value pairs may be ordered such that the fused index/value pair comes before the dummy index/value pair in the modified stream (as shown in Table 2). In other embodiments, the fused and dummy index/value pairs may be ordered such that the fused index/value pair comes after the dummy index/value pair in the modified stream. In a specific embodiment, the fused and dummy index/value pairs are sequenced such that they are temporally adjacent in the modified stream.

Once the stream is modified as per steps 406 and 408, the modified stream is passed to a pipelined processing component of the counter logic circuit (e.g., pipelined processing block 120 of FIG. 1). The pipelined processing component is configured to carry out counter updates in accordance with the index/value pairs in the modified stream.

By merging index/value pairs that share a common counter index, the processing of flowchart 400 eliminates or minimizes situations where a counter logic circuit needs to increment the same counter value in consecutive clock cycles. This allows for the critical path of a counter logic circuit to be shortened and for the maximum operating frequency of the counter logic circuit to be increased. Accordingly, performance and scalability is improved over prior art circuits/techniques.

It should be appreciated that the specific steps illustrated in FIG. 4 provide a particular method for incrementing a counter in a logic circuit according to an embodiment of the present invention. Other sequences of steps may also be performed according to alternative embodiments. For example, the individual steps illustrated in FIG. 4 may include multiple sub-steps that may be performed in various sequences as appropriate to the individual step. Further, additional steps may be added or removed depending on the particular applications. One of ordinary skill in the art would recognize many variations, modifications, and alternatives.

Figure 5:
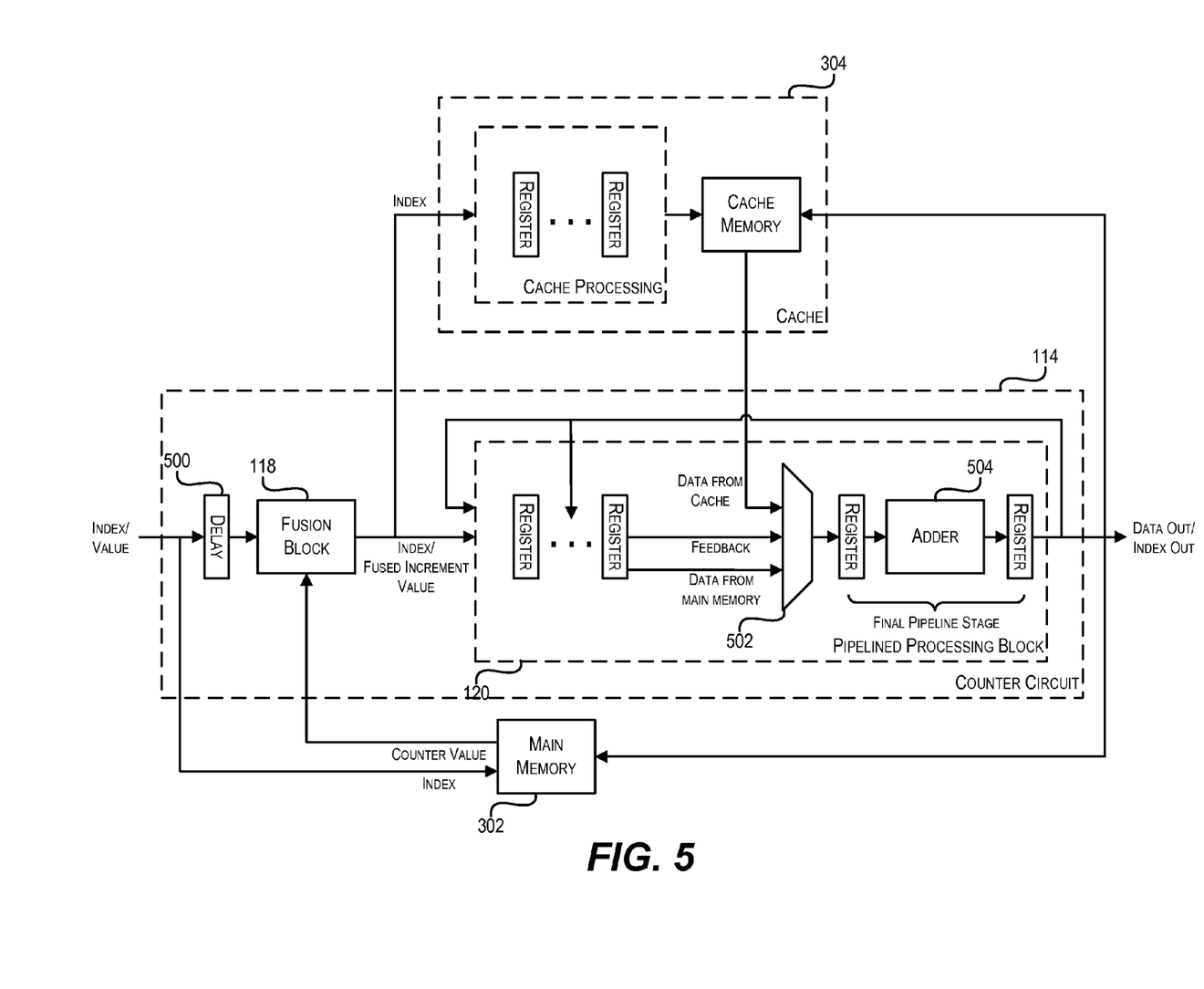
FIG. 5 is a simplified block diagram of a counter logic circuit in accordance with an embodiment of the present invention.

FIG. 5 is a more detailed block diagram of counter logic circuit 114 of FIG. 1. In one set of embodiments, counter logic circuit 114 may be implemented in an FPGA. In another set of embodiments, counter logic circuit 114 may be fabricated as an ASIC. In a particular embodiment, counter logic circuit 114 is implemented within a network device (as shown in FIG. 1) for the purpose of incrementing one or more counters related to the processing of the network device.

As shown, counter logic circuit 114 receives an input stream comprising a plurality of index/value pairs, each pair including a counter index and an increment value. In an embodiment, one index/value pair is received per clock cycle of the circuit. The counter index for each index/value pair is sent to main memory 302 to read the current main memory value for the index. Further, the stream is delayed at delay block 500. The stream is then passed to fusion block 118. In various embodiments, the delay performed at delay block 500 is used to account for the read latency of main memory 302. Specifically, each index/value pair is delayed for a specific number of clock cycles at delay block 500 so that when the pair reaches fusion block 118, the corresponding counter value for the pair has been retrieved from main memory 302.

In various embodiments, fusion block 118 is configured to modify the stream as described with respect to flowchart 400 of FIG. 4. For example, fusion block 118 is configured to determine two or more index/value pairs in the stream that share a common counter index. Further, fusion block 118 is configured to modify the stream to include a dummy index/value pair and a fused index/value pair based on the two or more index/value pairs.

Once the stream has been modified at fusion block 118, each index/value pair in the stream is passed, in sequence, to pipelined processing block 120. In addition, the counter index for each index/value pair is passed to cache 304 to read the current cached value for the index. Since the cache read operation will generally consume several clock cycles, pipelined processing block 120 includes several pipeline stages to hide this cache read latency. For example, if a cache read consumes five clock cycles, pipelined processing block 120 will typically include five or more pipeline stages so that a cache read request initiated at the start of the pipeline will be fulfilled at (or near) the end of the pipeline.

In the example of FIG. 5, the cached value for the counter index is received in the next-to-last pipeline stage of pipelined processing block 120. This cached counter value, along with the counter value read from main memory 302 and a feedback value from the output of circuit 114, is fed into multiplexer 502. As discussed previously, the feedback value is used to maintain data coherency in situations where an updated counter value needs to be retrieved before it can be read back from cache. Multiplexer 502 is configured to select the most up-to-date counter value from among the three input values.

The counter value selected by multiplexer 502 is then passed to the final pipeline stage, where it is incremented by the increment value included in the index/value pair via adder 504. Finally, the incremented value is output from circuit 114 and written back to main memory 302 and cache memory 304.

In conventional counter logic circuit designs, the output of the circuit must generally be fed back into the final pipeline stage, where the feedback value is selected using a multiplexer and incremented using an adder. This feedback at the final pipeline stage is necessary to account for situations where the same counter value is incremented in back-to-back clock cycles (i.e., where the stream includes consecutive index/value pairs with the same counter index). However, since embodiments of the present invention merge back-to-back dependent counter updates, this type of design is no longer necessary. Accordingly, as shown in circuit 114, there is no feedback into the final pipeline stage. Rather, the feedback mechanism of circuit 114 can feed back the output of the circuit into earlier pipeline stages (e.g., the next-to-last pipeline stage).

In addition, in conventional counter logic circuit designs, both a multiplexer operation (for selecting the feedback value) and an addition operation (for incrementing the feedback value) must generally be performed in the final pipeline stage. This constitutes the critical path of the circuit. However, since embodiments of the present invention can feed back the output of circuit 114 into earlier pipeline stages, the multiplexer operation can be moved out of the final stage. For example, as shown in circuit 114, multiplexer 502 is located in the next-to-last pipeline stage rather than the last pipeline stage. Thus, circuit 114 only performs the increment of the selected feedback value (via adder 504) in the final stage. This design significantly shortens the critical path of the circuit and allows for higher maximum operating frequencies than prior art designs.

It should be appreciated that circuit 114 illustrates one possible counter logic circuit in accordance with embodiments of the present invention, and other alternative configurations are contemplated. One of ordinary skill in the art would recognize many variations, modifications, and alternatives.

Although specific embodiments of the invention have been described in the foregoing disclosure, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

The specification and drawings are, accordingly, to be regarded in an illustrative rather than a restrictive sense. It should be evident that additions, subtractions, deletions, and other modifications and changes may be made thereunto without departing from the broader spirit and scope of the invention as set forth in the claims.

What is claimed is:

1. A method for incrementing a counter in a logic circuit, the method comprising:
   receiving a stream comprising a plurality of index/value pairs, each index/value pair including a counter index referencing a counter value to be incremented and an increment value;
   determining two or more index/value pairs in the stream that include a common counter index; and
   causing the stream to include an index/value pair including the common counter index and an increment value corresponding to a sum of the increment values included in the two or more index/value pairs.

2. The method of claim 1, wherein determining the two or more index/values pairs comprises determining exactly two index/value pairs.

3. The method of claim 1, wherein the two or more index/value pairs are temporally adjacent in the stream.

4. The method of claim 1, wherein causing the stream to include the index/value pair including the common counter index and the increment value corresponding to a sum of the increment values included in the two or more index/value pairs comprises modifying a first index/value pair in the two or more index/value pairs such that the increment value included in the first index/value pair corresponds to the sum of the increment values included in the two or more index/value pairs.

5. The method of claim 4 further comprising modifying a second index/value pair in the two or more index/value pairs such that the counter index included in the second index/value pair no longer corresponds to the common counter index.

6. The method of claim 1, wherein causing the stream to include the index/value pair including the common counter index and the increment value corresponding to a sum of the increment values included in the two or more index/value pairs comprises:
   creating a new index/value pair based on the two or more index/value pairs, the new index/value pair including the common counter index and an increment value corresponding to a sum of the increment values included in the two or more index/value pairs;
removing the two or more index/value pairs from the stream; and
inserting the new index/value pair into the stream.

7. The method of claim 6 further comprising:
creating a dummy index/value pair including a dummy counter index; and
inserting the dummy index/value pair into the stream such that the dummy index/value pair is temporally adjacent to the index/value pair including the common counter index and the increment value corresponding to a sum of the increment values included in the two or more index/value pairs.

8. The method of claim 1, wherein a sliding window is used to determine a set of index/value pairs in the stream from which the two or more index/value pairs are determined.

9. The method of claim 8, wherein the size of the sliding window is predetermined based on a maximum acceptable latency for the logic circuit.

10. The method of claim 1, wherein subsequent to causing the stream to include the index/value pair including the common counter index and the increment value corresponding to a sum of the increment values included in the two or more index/value pairs, the stream is passed to a pipelined processing component of the logic circuit, the pipelined processing component being configured to increment one or more counter values based on the stream.

11. The method of claim 1, wherein the logic circuit is implemented in a packet processor of a network device, and wherein the stream is generated based on one or more data packets received at the packet processor.

12. The method of claim 11, wherein the counter is a statistics counter.

13. The method of claim 11, wherein the network device is an Ethernet switch.

14. The method of claim 11, wherein the packet processor is configured to support a data throughput rate of at least 40 gigabits per second.

15. The method of claim 11, wherein the packet processor is configured to support a data throughput rate of at least 100 gigabits per second.

16. A logic circuit for incrementing a counter, the logic circuit comprising:
a fusion component configured to:
receive a stream comprising a plurality of index/value pairs, each index/value pair including a counter index referencing a counter value to be incremented and an increment value;
determine two or more index/value pairs in the stream that include a common counter index; and
cause the stream to include an index/value pair including the common counter index and an increment value corresponding to a sum of the increment values included in the two or more index/value pairs.

17. The logic circuit of claim 16, wherein the two or more index/value pairs are temporally adjacent in the stream.

18. The logic circuit of claim 16 further comprising:
a pipelined processing component configured to:
receive the stream from the fusion component; and
increment one or more counter values based on the stream.

19. The logic circuit of claim 18, wherein the pipelined processing component comprises a plurality of successive pipeline stages including an adder pipeline stage configured to add an increment value to a counter value, and wherein the pipelined processing component is configured to feed back an output of the pipelined processing component to each pipeline stage in the plurality of successive pipeline stages except the adder pipeline stage.

20. The logic circuit of claim 19, wherein the adder pipeline stage is the final pipeline stage in the plurality of successive pipeline stages.

21. The logic circuit of claim 18, wherein the pipelined processing component comprises a plurality of pipeline stages including an adder pipeline stage configured to add an increment value to a counter value, and wherein the pipelined processing unit does not require a multiplexing operation to be performed in the adder pipeline stage.

22. The logic circuit of claim 16, wherein the logic circuit is implemented in a packet processor of a network device, and wherein the stream is generated based on one or more data packets received at the packet processor.

23. A network device comprising:
a logic circuit for incrementing a counter, the logic circuit including a fusion component configured to:
receive a stream comprising a plurality of index/value pairs, each index/value pair including a counter index referencing a counter value to be incremented and an increment value;
determine two or more index/value pairs in the stream that include a common counter index; and
cause the stream to include an index/value pair including the common counter index and an increment value corresponding to a sum of the increment values included in the two or more index/value pairs.

24. The network device of claim 23, wherein the two or more index/value pairs are temporally adjacent in the stream.

25. The network device of claim 23, wherein the logic circuit further includes a pipelined processing component configured to:
receive the stream from the fusion component; and
increment one or more counter values based on the stream.

26. The network device of claim 25, wherein the pipelined processing component comprises a plurality of successive pipeline stages including an adder pipeline stage configured to add an increment value to a counter value, and wherein the pipelined processing component is configured to feed back an output of the pipelined processing component to one or more pipeline stages in the plurality of successive pipeline stages except the adder pipeline stage.

27. The network device of claim 25, wherein the pipelined processing component comprises a plurality of pipeline stages including an adder pipeline stage configured to add an increment value to a counter value, and wherein the pipelined processing unit does not require a multiplexing operation to be performed in the adder pipeline stage.

* * * * *